US006636404B1

(12) United States Patent
Whitney et al.

(10) Patent No.: US 6,636,404 B1
(45) Date of Patent: Oct. 21, 2003

(54) INTEGRATED OVERCURRENT AND OVERVOLTAGE APPARATUS FOR USE IN THE PROTECTION OF TELECOMMUNICATION CIRCUITS

(75) Inventors: Stephen J. Whitney, Lake Zurich, IL (US); David Zhang, Des Plaines, IL (US); Scott Davidson, Woodstock, IL (US)

(73) Assignee: Littelfuse, Inc., Des Plaines, IL (US)

( * ) Notice: Subject to any disclaimer, the term of this patent is extended or adjusted under 35 U.S.C. 154(b) by 290 days.

(21) Appl. No.: 09/649,762

(22) Filed: Aug. 28, 2000

Related U.S. Application Data

(63) Continuation-in-part of application No. 09/534,277, filed on Mar. 24, 2000.

(51) Int. Cl.[7] .................................................. H02H 3/22

(52) U.S. Cl. ........................................ 361/111; 361/119

(58) Field of Search ......................... 361/79, 91.1, 91.8, 361/93.1, 93.8, 104, 111, 117, 118, 119

(56) References Cited

U.S. PATENT DOCUMENTS 3,582,713 A * 6/1971 Till ............................ 361/79
4,073,004 A * 2/1978 Chambers et al. ............ 363/79
4,467,308 A 8/1984 Arikawa et al.
4,920,327 A 4/1990 Arikawa et al.
5,214,406 A 5/1993 Reese et al.
5,699,032 A 12/1997 Ulm, Jr. et al.
5,896,260 A * 4/1999 Esposito ...................... 361/79
5,977,860 A 11/1999 Ulm, Jr. et al.
6,510,032 B1 * 1/2003 Whitney ..................... 361/111

* cited by examiner

*Primary Examiner*—Adolf D. Berhane
(74) *Attorney, Agent, or Firm*—Bell, Boyd & Lloyd, LLC

(57) ABSTRACT

An integrated overvoltage and overcurrent circuit protection device for use in telecommunication circuits. The integrated circuit protection device combines a overcurrent device such as a fuse and a overvoltage protection device such as a thyristor to respectively protect against overcurrent conditions and transient overvoltages. Integration of multiple devices in a common package ensures proper coordination and matching of the components, reduces the final product cost and reduces the physical space required on a telecommunications circuit for overvoltage and overcurrent circuit protection.

20 Claims, 7 Drawing Sheets

INTEGRATED OVERCURRENT AND OVERVOLTAGE APPARATUS FOR USE IN THE PROTECTION OF TELECOMMUNICATION CIRCUITS

This application is a Continuation-In-Part of U.S. application Ser. No. 09/534,277, filed Mar. 24, 2000.

BACKGROUND OF THE INVENTION

The present invention relates to overvoltage and overcurrent protection apparatus for telecommunication circuitry and method of manufacturing same. In particular, the invention relates to fuses and thyristors.

Circuitry, particularly sensitive circuitry such as that found in telecommunication systems, require protection against both overcurrent and overvoltage conditions that may arise. Conditions such as short circuits may arise requiring an overcurrent protection device, such as a fuse, in order to prevent damage to circuitry.

Lightning is a common source of overvoltage in communication systems. Typically, communication systems consist of conductors in shielded cables suspended on poles or buried in the earth. The cable is made up of many conductors arranged in twisted pairs, commonly known as "Tip" and "Ring" lines for telephone systems, in particular. These cables are susceptible to transient energy from lightning and may conduct energy from the lightning to either a central office or subscriber equipment. Additionally, power sources for telecommunication systems are usually obtained from commercial power lines, which are also subject to excess energy from lightning that can, in turn, induce overvoltages in the telecommunication system being supplied by the power line.

Common approaches in the art to mitigate overcurrents and overvoltages include a combination of a fuse and a semiconductor overvoltage device such as a bi-directional thyristor, as shown in the circuit of FIG. 1. A fuse 100 is placed in series with a copper twisted pair 102 either in the Tip line 104 or in the Ring line 106. Hence, the fuse 100 protects the tip and ring wiring and also a bi-directional thyristor 110 from excessive energy in the event a continuous overvoltage is coupled to the wiring, as might occur if a power line falls across the wiring.

In order to limit overvoltage conditions, an overvoltage device such as the bi-directional thyristor 110 is connected across the twisted pair 102 in parallel with the telecommunication system 108. The thyristor 110 provides bi-directional "crow-bar" clamping of transients that may occur for either polarity. In particular, the thyristor 110 has a breakdown voltage at which a transient voltage exceeding this value will cause the thyristor 110 to begin clamping action across the lines 104 and 106. As the transient voltage attempts to rise higher, the current through the thyristor 110 will increase until a break-over voltage is reached. At this point, thyristor action is triggered and the thyristor 110 switches to its "on" or "latched" state. This is a very low impedance state that shunts or "crow-bars" the line, thereby suppressing the magnitude of the transient voltage. When the transient voltage diminishes, the thyristor 110 turns off and reverts to a high impedance "off" state.

The circuit of FIG. 1 is commonly used to protect "Tip" and "Ring" connections such as modems, telephones, facsimile machines, and line cards. While the circuit of FIG. 1 is appropriate for copper twisted pair environments, other voltage environments are also suitable for circuits sought to be protected such as alarm circuits, power supplies, remote sensors, CATV, data lines, etc.

The protection circuits used in telecommunication applications, such as that shown in FIG. 1, commonly utilize discretely packaged fuse and thyristor components connected in printed circuit wiring. The discrete component approach, however, requires that the components be properly coordinated and matched with one another in order to meet pertinent regulatory and safety agency requirements. Also, the discretely packaged components are typically sourced separately, thus adding increased cost to the final product. Furthermore, using discrete components consumes considerable physical space on a printed circuit board since two separate component packages must be placed on the printed circuit board.

SUMMARY OF THE INVENTION

There is a need for an improved circuit device that achieves both overcurrent and overvoltage protection in a discrete integral package to more easily assure coordination and matching of the overcurrent and overvoltage devices. In addition, there is a need for a discrete integral package approach that affords lower final product cost and reduces the physical space consumed in a printed circuit.

These and other advantages are provided by the present invention, where overcurrent and overvoltage protection devices are packaged in a common housing to form a single discrete circuit element that is substantially no larger than one of the overcurrent or overvoltage devices that are each discretely packaged as previously known in the art, such as a standard surface mount telecommunications fuse, for example.

In an embodiment, the present invention provides an integral circuit protection device providing overcurrent and overvoltage protection for a circuit that is configured to be connected to the circuit. The device includes an overcurrent protection portion, an overvoltage protection portion, and a plurality of terminals for connecting both the overvoltage and overcurrent protection portions of the integral circuit device to the circuit to be protected. Incorporation of both overvoltage and overcurrent devices into a single housing assures that these components are coordinated and matched for a particular application, lowers the total cost of the device since the components are not sourced separately and allows for smaller size by incorporating the devices into the same package.

In another embodiment the plurality of terminals includes first, second and third terminals with the overcurrent protection portion electrically connected between the first and second terminals and the overvoltage protection portion connected between the second and third terminals.

In another embodiment, the overcurrent protection portion includes a fuse.

In another embodiment, the overvoltage protection portion includes a bi-directional thyristor.

In another embodiment, the plurality of terminals of the integral circuit are configured to electrically connect the overcurrent protection portion in series with the circuit to be protected and to electrically connect the overvoltage protection portion in parallel with the circuit to be protected when the integral circuit device is electrically connected to the circuit to be protected.

In yet another embodiment, the integral circuit further includes a thermally conductive portion that conducts heat away from the overvoltage protection portion.

In an embodiment, thermal coefficients of the thermally conductive portion and overvoltage protection portion are substantially the same.

In an embodiment, the overvoltage protection portion is at least partially encapsulated with an atmospherically resistant material.

In another embodiment, the integral circuit device is configured for mounting on a printed circuit board.

In another embodiment, the integral circuit device is configured substantially the same as a standard telecommunications fuse configuration.

In yet another embodiment of the present invention, a circuit element is provided for overvoltage and overcurrent protection of a circuit. The circuit element includes a circuit element housing having first, second and third terminals. An overcurrent protection device is electrically connected between the first and second terminals and contained by the circuit element housing. In addition, an overvoltage protection device is electrically connected between the second and third terminals and also contained by the circuit element housing.

In an embodiment, the circuit element housing is comprised of a tube having an outer surface, an inner hollow portion, a first end and a second end. The overcurrent protection device is disposed within the inner hollow portion of the tube, the overvoltage protection device and the second terminal are disposed on the outer surface of the tube, the first terminal is disposed at the first end and the second terminal is disposed at the second end opposite from the first terminal.

In another embodiment, the first and second terminals include electrically conductive layers disposed on the outer surface of the tube adjacent to each of the first and second ends and extending into part of the inner hollow portion adjacent to the first and second ends. Additionally, conductive end caps respectively cover the electrically conductive layers and the first and second ends and electrically connected to the electrically conductive layers. The electrically conductive layers are also electrically connected to the overcurrent device disposed within the inner hollow portion of the tube.

In yet another embodiment, the third terminal is comprised of a conductive terminal disposed on the outer surface of the tube.

In another embodiment, a die bond pad disposed on the outer surface of the tube. A bond pad conductor is also disposed on the outer surface of the tube and electrically connected to at least one of the first and second conductive layers. A first conductor electrically connects the bond pad conductor to the die bond pad die bond pad and a second conductor electrically connects the third terminal to the die bond pad. A thyristor is disposed on the die bond pad and covered with an encapsulant material.

In an embodiment, the encapsulant material is atmospherically resistant and disposed such that the thyristor and the die bond pad on the outer surface of the tube are sealed to resist surrounding atmosphere.

In another embodiment, the thyristor disposed on the die bond pad is bonded to the die bond pad by a thermally conductive bonding material.

In an embodiment, the circuit element housing includes a substrate having first and second surfaces and a plurality of wire terminations disposed on at least one of the first and second surfaces, wherein the first, second and third terminals are each respectively comprised of one of the plurality of wire terminations.

In an embodiment, the overcurrent device is comprised of a fuse element electrically connected between the first and second terminals and disposed on at least one side of the substrate. The overvoltage device is comprised of a thyristor electrically connected between the second and third terminal and disposed on at least one side of the substrate.

In a further embodiment of the present invention, a circuit element is provided for overvoltage and overcurrent protection for circuitry in a telecommunications system. The circuit element includes a fuse element, a semiconductor overvoltage protection device, and a package configured as a discrete component that is mountable on a printed circuit board, the package containing the fuse element and the semiconductor overvoltage protection device.

In another embodiment, the package includes first, second and third terminals. In addition, the fuse element and the semiconductor overvoltage protection device both include corresponding first and second lead connections. The first terminal is connected to the first lead connection of the fuse element, the second terminal is connected the second lead connection of the fuse element and the first lead connection of the semiconductor overvoltage protection device and the third terminal is connected to the second lead connection of the semiconductor overvoltage protection device.

In a still further embodiment of the present invention, the invention provides a method for providing an overcurrent and overvoltage device in a telecommunications circuit. The method includes providing a housing configured to receive an overcurrent protection element and an overvoltage protection element, the housing having a plurality of terminals. The overcurrent and overvoltage protection elements are disposed within the housing such that the overcurrent protection element is electrically connected between first and second terminals of the plurality of terminals and the overvoltage protection element is electrically connected between the second terminal and a third terminal of the plurality of terminals. Finally, the housing is connected as a single discrete element to a circuit board that includes the telecommunications circuit.

In another embodiment, the method further includes providing the mounting member with both a second overcurrent protection element and a second overvoltage protection element, and disposing the second overcurrent and overvoltage protection elements within the mounting member such that the second overcurrent protection element is electrically connected between fourth and fifth terminals of the plurality of terminals and the second overvoltage protection element is electrically connected between the third and fifth terminals of the plurality of terminals.

In another embodiment, the present invention provides an integral circuit protection device providing overcurrent and overvoltage protection for a circuit and configure to be connected to the circuit. The integral circuit device includes an overcurrent protection portion and an overvoltage protection portion disposed at one end of two opposing ends of the device. In addition, a number of terminals for connecting the overcurrent protection portion and the overvoltage protection portion to the circuit are provided. The terminals are substantially disposed, respectively, at one of the two opposing ends of the device.

In another embodiment, the overcurrent protection portion is a fuse.

In another embodiment, the overvoltage protection portion is a semiconductor die having characteristics similar to a zener diode.

In another embodiment, the overvoltage protect portion is a bi-directional thyristor.

In another embodiment, the terminals contain first, second and third terminals. The overcurrent protection portion is electrically connected between the first and second terminals and the overvoltage protection portion is connected between the second and third terminals.

In yet another embodiment, the terminals of the integral circuit device are configured to electrically connect the overcurrent protection portion in series with the circuit to be protected and electrically connects the overvoltage protection portion in parallel with the circuit to be protected when the integral circuit device is electrically connected to the circuit to be protected.

In another embodiment, the integral device includes a thermally conductive portion that conducts heat away from the overvoltage protection portion.

In another embodiment, the first terminal is configured at the first end, the second terminal is configured at the second end, and the third terminal is configured at the second end, disposed outward from the second terminal.

In another embodiment, the overvoltage protection portion is disposed between the second and third terminals.

In still another embodiment, the first terminal is positioned at the first end, the second terminal is positioned at the first end, and the third terminal is positioned at the second end.

In another embodiment, the overvoltage protection portion is disposed inward of and adjacent to the third terminal.

In another embodiment, first, second and third terminals are disposed on the same end of the device.

In yet another embodiment, first, second and third terminals are disposed on the end opposing the end of the device that the overvoltage protection portion is on and further comprising an encapsulation that covers the overvoltage protection portion.

In another embodiment, the device further includes a housing having first and second ends wherein the overcurrent protection portion is contained by the housing and the first, second and third terminals are disposed outward of the first and second housing ends.

In another embodiment, the overvoltage protection portion further includes an insulating frame having a first end and a second end and a hollow inner portion extending therebetween. An overvoltage protection element is configured within the inner hollow portion.

In another embodiment, the first, second and third terminals are formed on at least one same side of the integral circuit protection device.

In another embodiment, the integral circuit protection device is configured for mounting on a printed circuit board.

In another embodiment, the invention provides an integral overvoltage and overcurrent protection device that has an insulating housing having a first end and a second end and a hollow portion extending therebetween. A fuse element is in the hollow portion. At least two terminations are provided in which a first termination is at the first end of the housing and a second termination is at the second end of the housing. An overvoltage protection portion is on the second end of the housing.

In another embodiment, the overvoltage protection portion includes an insulating frame that has a hollow portion and an overvoltage protection element is configured within the hollow portion.

In another embodiment, the overvoltage protection portion further includes a conductive plate that is adjacent to the overvoltage protection element.

Additional advantages and features of the present invention will become apparent upon reading the following detailed description of the presently preferred embodiments and appended claims, and upon reference to the attached drawings.

BRIEF DESCRIPTION OF THE FIGURES

Reference is made to the attached drawings, wherein elements having the same reference numeral represent like elements throughout and wherein.

DETAILED DESCRIPTION OF THE PRESENTLY PREFERRED EMBODIMENTS

The present invention provides a single discrete component that includes an overcurrent protection element and an overvoltage protection element enclosed by a common housing. Additionally the present invention provides methods of manufacturing same.

Figure 1:
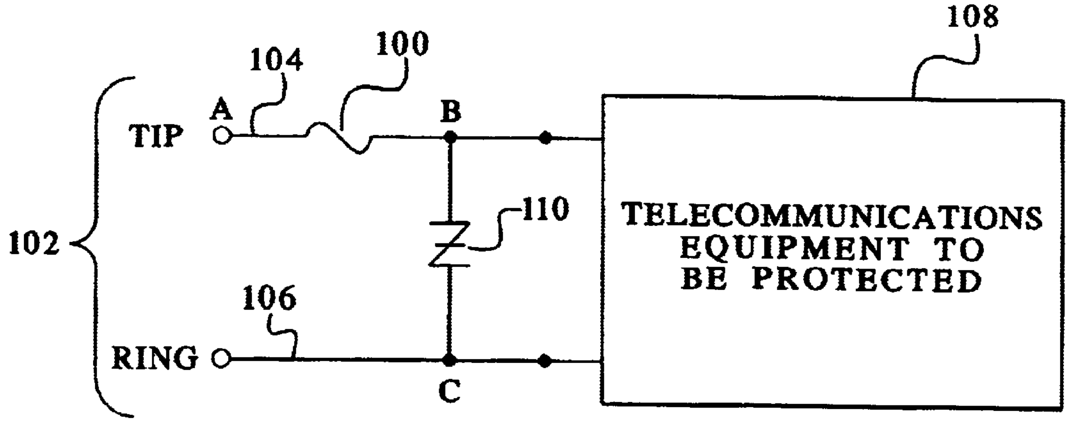
FIG.1 (PRIOR ART)
FIG. 1 is a schematic illustrating circuit connections for a conventional circuit protecting against overcurrent and overvoltage for telecommunication equipment.
Figure 2:
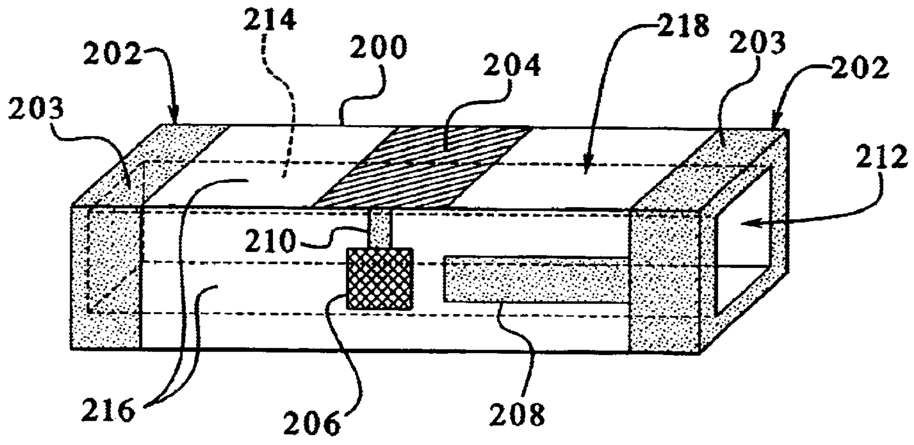
FIGS. 2–4 illustrate the construction steps for an integral overcurrent and overvoltage circuit element according to an embodiment of the present invention.
Figure 3:
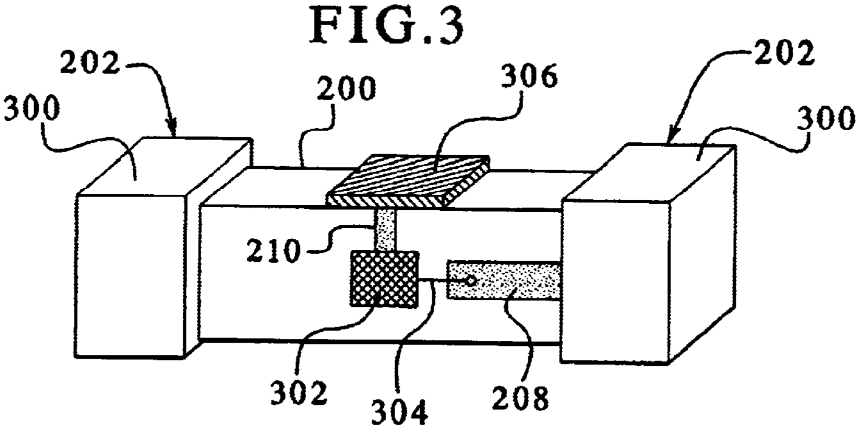
Figure 4:
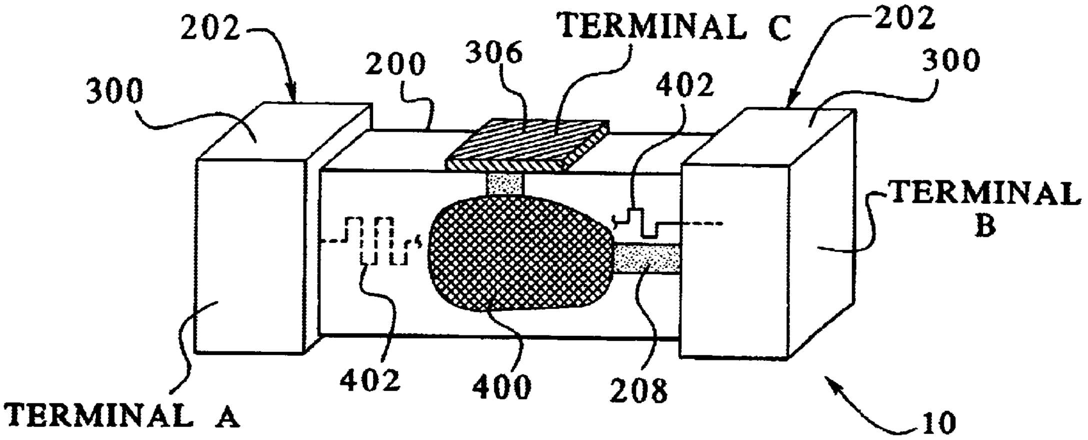

Referring now to the drawings, FIGS. 2–4 illustrate the construction of an overcurrent and overvoltage protection device 10 (shown in finished form in FIG. 4) according to an embodiment of the present invention that integrates fuse and thyristor components shown in FIG. 1 into a single, discrete circuit element. Hence, the circuit element shown in FIG. 4 has the same circuit arrangement as shown in FIG. 1, but includes both a fuse device and a semiconductor overvoltage device, preferably a bi-directional thyristor, in a common package.

As shown in FIG. 2, the circuit element is constructed of a tube 200 that is preferably hollow as indicated by hole 212. The hollow space 214 inside the tube accommodates a fuse element. The tube 200 is constructed of a material that is thermally conductive such as ceramic, for example, in order to dissipate heat energy released by a fuse element within the tube or a semiconductor thyristor element that is placed on an outer surface 216 of the tube. Each end of the tube 202 may include a surface metallization 203 that is disposed on the outer surface 216 of the tube end 202 and may extend around the end portions 202 into the inner hollow portion 214 of the tube 200. These metallizations 203 are used for electrically connecting terminals of a fuse element that is located within the inner hollow portion of the tube.

FIG. 2 also illustrates a die bond pad 206 that is disposed on the outer surface 216 of the tube 200. This die bond pad 206 is preferably a metallization that is used for bonding a thyristor to be placed on the outer surface 216 of the tube 200. This die bond pad 206 may be disposed on the tube 200 by various known methods such as screen printing, chemical vapor deposit or sputtering. Additionally, a bond pad 208 is similarly disposed on the outer surface 216 of the tube 200, preferably on the same surface of a square tube as shown in FIGS. 2–4 as the die bond pad 206. The bond pad 208 is disposed so as to electrically contact the metallization 203 at least at one end of the tube 200. Tube 200 also includes a metallization 204 that will be used for placing a common terminal corresponding to terminal "C" as shown in FIG. 1. In a preferred embodiment, the metallization 204 is placed on a side 218 of the tube 200 different from the die bond pad 206 and the bond pad conductor 208 due to space considerations. However, the metallization 204 can be placed on sides other than side 218. That is, in order to minimize the longitudinal length of the tube 200, it is preferable to utilize more than one side or surface of the tube 200 to place terminals and components. A metallization conductor 210 is included to electrically connect the die bond pad 206 to the metallization 204 that will later become a common terminal.

FIG. 3 illustrates the next step in construction of the circuit element of the present invention. Specifically, end caps 300, which facilitate connection of the circuit element to a printed circuit board in the telecommunications equipment being protected, are located on each end 202 of the tube 200 and electrically connect to the metallization 203 on each end of the tube 200 that, in turn, are connected to the two ends of the fuse element within the inner hollow portion 214 of the tube 200. In an alternate embodiment, metallization 203 may be omitted, in which case the end caps 300 connect directly with the fuse element and metallization 208.

FIG. 3 also illustrates the placement of a thyristor device 302 on the die bond pad 206. The thyristor 302 is bonded to the die bond pad 206 by methods commonly known in the art to provide thermal and electrical conductivity between the component and bond pad. Examples of such methods include soldering or affixing with conductive epoxy. Irrespective of the affixing type, the bonding method utilized must provide thermal and electrical conductivity between the thyristor and the bond pad that, in turn, thermally conducts with the tube 200 and electrically conducts to pad 206. This thermal conductivity allows heat energy generated during an overvoltage condition that causes current to flow in the thyristor to be dissipated by and throughout the tube 200. Dissipating heat from the thyristor 302 reduces the risk of damage to the thyristor 302 from heat energy released during its operation under overvoltage conditions.

Preferably, the thyristor 302 is constructed with a vertical structure that it is substantially flat having a cathode on one surface and an anode on the opposing surface. Accordingly, when the thyristor 302 is placed on the die bond pad 206, one of the cathode or anode is in electrical contact with the die bond pad 206 and the other opposing thyristor terminal (i.e., either the anode or cathode) faces away from the tube 200. Hence, connection with the opposing terminal to the bond pad 208 requires either a bond wire or a bond strap 304.

Finally, FIG. 3 illustrates a metal terminal 306 is disposed on the metallization 204 shown in FIG. 2, to form a common terminal corresponding to terminal C shown in FIG. 1.

FIG. 4 illustrates the finished circuit element including a fuse element 402 within the inner portion of the tube 200 and indicated by dashed lines to delineate its position within the tube 200. The fuse element 402 is connected between terminal A and terminal B, these terminals, in turn, being used to connect the fuse between the Tip line of a twisted pair and the telecommunications equipment being protected (i.e., 108 in FIG. 1). Furthermore, the bi-directional thyristor 302 is connected between terminals B and C via bond pad 208, bond wire 304, conductor 210 and metal terminal 306 (i.e., Terminal C). Hence, the bi-directional thyristor 302 can be connected in parallel with the telecommunications equipment 108 by connecting terminal B to the Tip line entering the equipment, terminal C, and the Ring line.

Additionally, FIG. 4 illustrates that the bi-directional thyristor 302 and bond wire or strap 304 are encapsulated by an encapsulant 400 in order to atmospherically seal the thyristor 302 from potentially degrading atmospheric conditions, such as moisture. Preferably, an epoxy encapsulant is used in sufficient quantity to totally encapsulate the thyristor 302 and the bond wire 304 from the outer surface of the tube 200. The circuit element may also include an insulated filling within the inner hollow portion 214 of the tube 200 around the fuse element 402 in order to suppress arcing energy occurring when the fuse element opens the circuit due to an overcurrent condition. The insulative filling can be comprised of a material such as sand, for example. It is noted that the fuse element 402 may be constructed according to any configuration known in the art. Specific constructions may include a spiral wire wound around a cylindrical core, a straight wire fuse or a metal link fuse.

Figure 5:
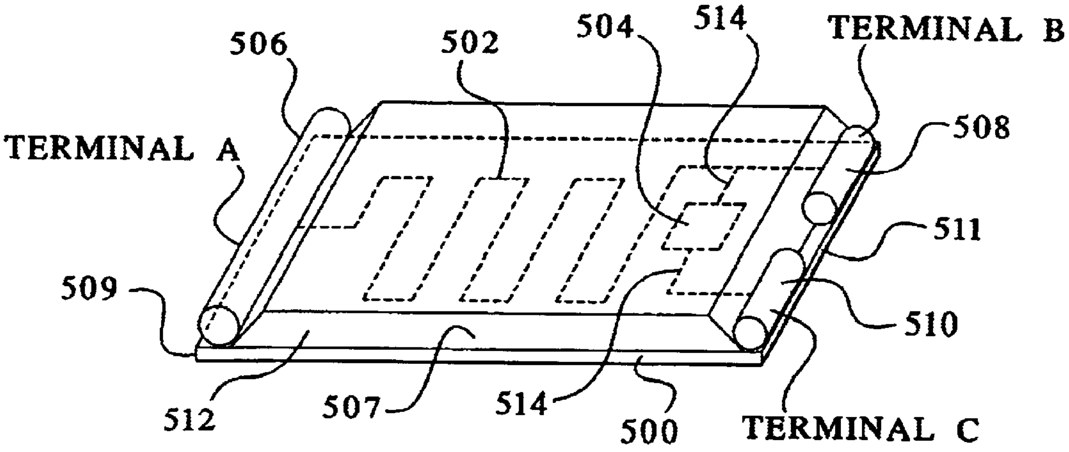
FIG. 5 illustrates a further integral overcurrent and overvoltage protection device according to an alternate embodiment of the present invention.

FIG. 5 illustrates an alternative embodiment of the present invention having a low profile that is advantageous for mounting a printed circuit board. The circuit element according to this embodiment includes a planar substrate 500 that is used for mounting the fuse and bi-directional thyristor elements thereon. Preferably, a fuse element 502 is bonded to a surface (i.e., surface 507 of FIG. 5) of the substrate 500 and electrically connected between a terminal 506 located adjacent to an edge (i.e., edge 509 of FIG. 5) of the substrate 500 and a terminal 508 located adjacent another edge (i.e., edge 511 of FIG. 5) of the substrate 500. Although FIG. 5 illustrates the fuse element and terminals disposed on a single side of the substrate 500, other embodiments can include fuse elements on both sides the substrate 500 and also terminals disposed on either side of the substrate 500 and on any portion thereof, not just adjacent to an edge.

Additionally, a bi-directional thyristor 504 is disposed on a surface (i.e., surface 507 of FIG. 5) of the substrate 500. Metallized terminals 514 connect the anode and cathode terminals of the thyristor 504 to terminals 508 and 510 corresponding to terminals B and C of the circuit of FIG. 1.

In a preferred embodiment, the fuse element 502 and bi-directional thyristor 504 are disposed on the same surface of the substrate 500, as are terminals 506, 508 and 510. Additionally, the fuse element 502 and bi-directional thyristor 504 are encapsulated within a encapsulant 512 to protect these elements from atmospheric conditions and also to contain energy dissipated by these elements during either overcurrent or overvoltage conditions. Furthermore, the substrate 500 is constructed of a thermally conductive material in order to draw heat away from components 502 and 504.

Preferably, for both disclosed embodiments, the thermal coefficients ($P_{CE}$) of the substrate 500 and the thyristor are substantially the same.

Figure 6:
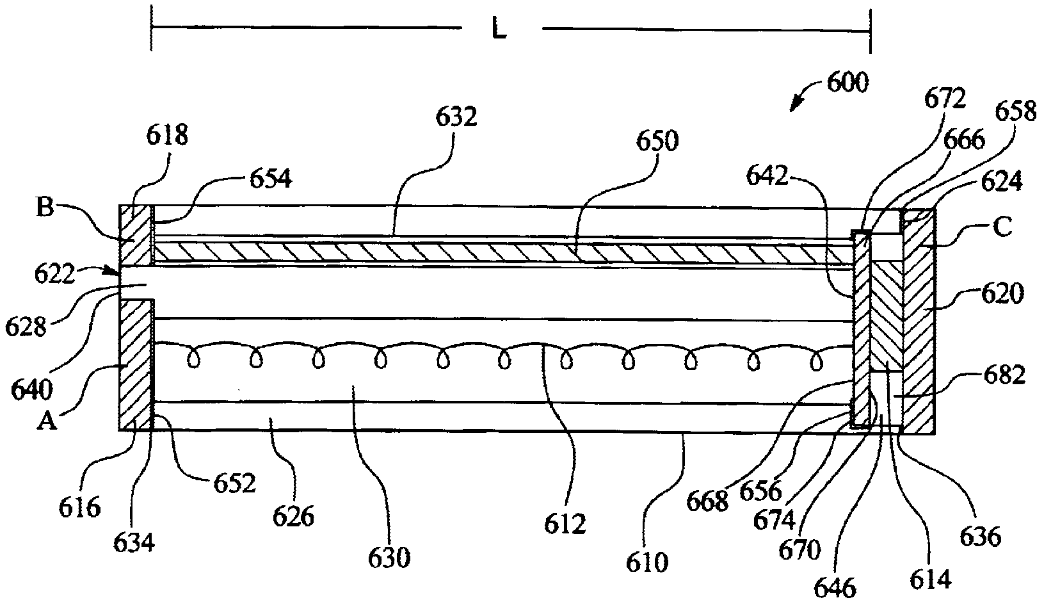
FIG. 6 illustrates a cross-sectional view of another integral overcurrent and overvoltage protection device according to an alternate embodiment of the present invention.

FIG. 6 illustrates an overcurrent and overvoltage protection device 600 according to another embodiment of the present invention. An insulating housing or body 610 integrates a fuse element 612 and a semiconductor die 614 into a single discrete device. First, second, and third terminals 616, 618, 620 provide electrical connections to the circuit.

The housing 610 has a first end 622, a second end 624, an outer wall 626, an intermediate wall 628, and two hollow portions 630, 632 extending therethrough. The outer wall 626 encircles the two hollow portions 630, 632 and has a first end 634 and a second end 636. The intermediate wall 628, however, divides the two hollow portions 630, 632. The intermediate wall 628 has an intermediate first end 640 and an intermediate second end 642. The housing 610 may be constructed from a variety of insulating materials, preferably ceramic.

The two hollow portions 630, 632 extend, in parallel, along a length L of the housing 610. As shown in FIG. 6, the intermediate second end 642 does not extend completely to the second end of the housing 610. However, the outer wall second end 636 does extend to the end 624 of the housing 610. As a result, a third hollow portion 646 is formed between the intermediate second end 642 and the second end 624 of the housing 610.

At the first end 622 of the housing 610, the intermediate wall 628 extends to the length L of the housing 610, whereas, the outer wall 626 does not extend the length L the housing 610. In this regard, the two hollow portions 630, 632 remain divided at the first end 634 of the housing 610.

The fuse element 612 is configured within the first hollow portion 630. The fuse element 612 provides the thermal protection in the device 600. As such, the fuse element 612 protects against harmful overcurrents, whether the overcurrent is an overload or a short circuit. The fuse element 612 may be formed from a variety of metal types, e.g., copper, tin, nickel, etc., depending on the $I^2R$ requirements of the particular application. Alternatively, it may be desirable to add a filler material within the first hollow portion 630 to reduce heat generated by the increase in resistance of the fuse element 612 during overcurrent conditions.

A wire element 650, e.g., a small gauge copper wire, is positioned in the second hollow portion 632. The embedded interconnect wire element 650 is used, advantageously, to reroute the termination 618. Alternatively, instead of a wire element 650, the second hollow portion could be through hole plated from one end to other.

The housing 610 is selectively metallized at at least the end faces of the housing 610 (See, e.g., references 652, 654, 656, 658) for making electrical and mechanical connections.

A fourth termination 666 is positioned within the third hollow portion 646. In this example, the fourth termination 666 has a first side 668, a second side 670, and an edge 672. The first side 668 overlaps the two hollow portions 630, 632 and a cutout section 674 of the outer wall 626 so that the edge 626 of the fourth termination 666 buttresses the outer wall 626. The fuse element 612 and the wire element 650 are in contact with the fourth termination 666. The fourth termination 666 is bonded to the housing 610 at the metallized end faces.

The overvoltage device 614, e.g., a semiconductor die, is disposed on the second side 670 of the fourth termination 666. Generally, the semiconductor die 614 has characteristics designed to protect against excessive voltages for example, a zener diode, thyristor or varistor.

The first, second and third terminations 616, 618, 620 are solid plates that attach to the ends 622, 624 of the housing 610. In this regard, the terminations 616, 618, 620, do not necessarily wrap around the ends 622, 624, of the housing. The terminations are bonded to the ends with either a conductive epoxy or solder. Advantageously, the width of the terminal plates 616, 618, 620 is approximately equal to the width of the housing 610. As such, the terminal plates are smaller in width than the width of a corresponding cap termination that would be required to wrap around the housing. Indeed, the area the device occupies on a printed circuit board is at a premium. Circuit board designers are always looking for ways to reduce such space. The incorporation of terminal plates instead of terminal caps reduces the width of the device and, in turn, the amount of area the device occupies on the circuit board. Furthermore, the discrete device is advantageous because it is a hermetically sealed device.

Generally, the terminations 616, 618, 620, 666 are made of a conductive material, e.g., copper or a pre-plated tin. The terminations 616, 618, 620, 666 are electrically and mechanically connected to the fuse element 612 and semiconductor die 614.

As a result, the semiconductor die 614 is sandwiched between two conductive plates 666, 620. A conductive epoxy or solder is used to attach the semiconductor die to the plates. In this embodiment, an area 682 remains between the semiconductor die 614, the outer wall 626 and the terminal plates 666, 620 that is air-filled. However, it may be desirable to utilize a filler material within the third hollow portion to enhance the performance of the device.

Figure 7:
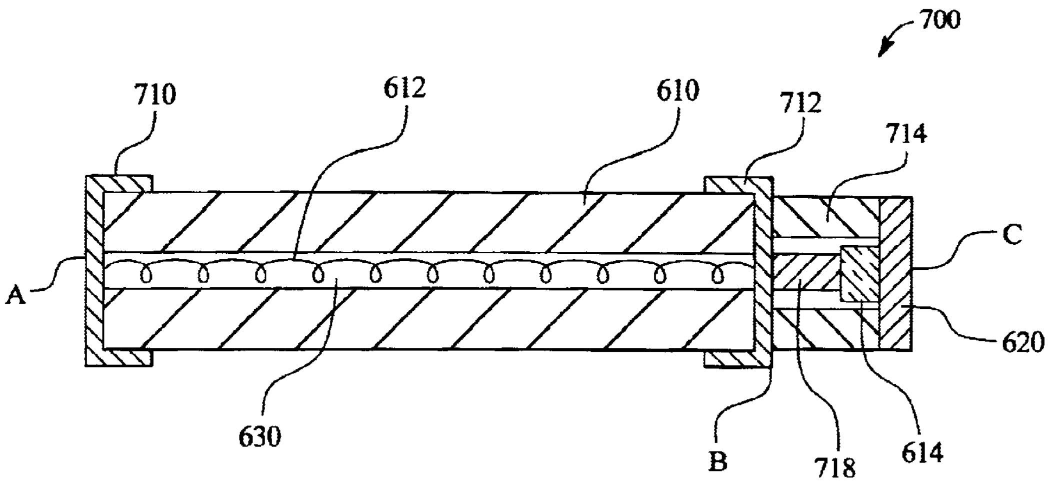
FIG. 7 illustrates a cross-sectional view of another overcurrent and overvoltage protection device according to an alternative embodiment of the present invention.

FIG. 7 illustrates an alternative embodiment of the present invention. As shown in FIG. 7, the housing 610 of the device 700 has only one hollow space or hollow portion 630. The single hollow portion 630 houses the fuse element 612. As an alternative to termination plates, end caps 710, 712 are provided at each end of the housing 610 and provide terminations to V+ (A) and the load (B). An insulating frame 714, such as ceramic, has a hollow portion 716. The hollow portion 716 houses the semiconductor die and a conductive plate 718.

In this embodiment, the insulating frame 714, the semiconductor die 614 and the conductive plate 718 are sandwiched between the end cap 712 and termination plate 620. The addition of the insulating frame 714 the conductive plate 718, the termination 620 to the device reduces the heat that is generated by the semiconductor die 614 during an overvoltage condition. In addition, the spacing of the device can be adjusted depending on the mounting requirements of the printed circuit board.

Figure 8:
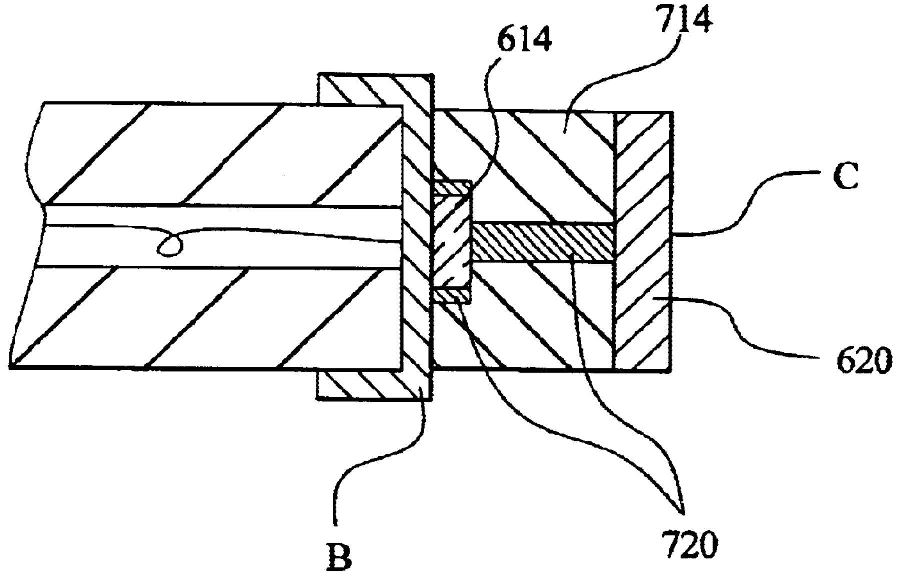
FIG. 8 illustrates a cross-sectional view of another overcurrent and overvoltage protection device according to alternative embodiment of the present invention.

FIG. 8 shows another embodiment of the present invention in which the insulating frame 714 has a hollow portion 720 including a plated through hole. The entire hollow portion 720 and the ends of the insulating frame are selectively metallized. In this embodiment, the semiconductor die 614 is disposed directly on the end cap (or plate) surface.

In the above examples, the semiconductor die is attached to the end caps or plates by applying a conductive epoxy or solder. With respect to the insulating frame, the insulating frame 714 can be secured to the device by using either a conductive epoxy, solder or a non-conductive epoxy.

Figure 9:
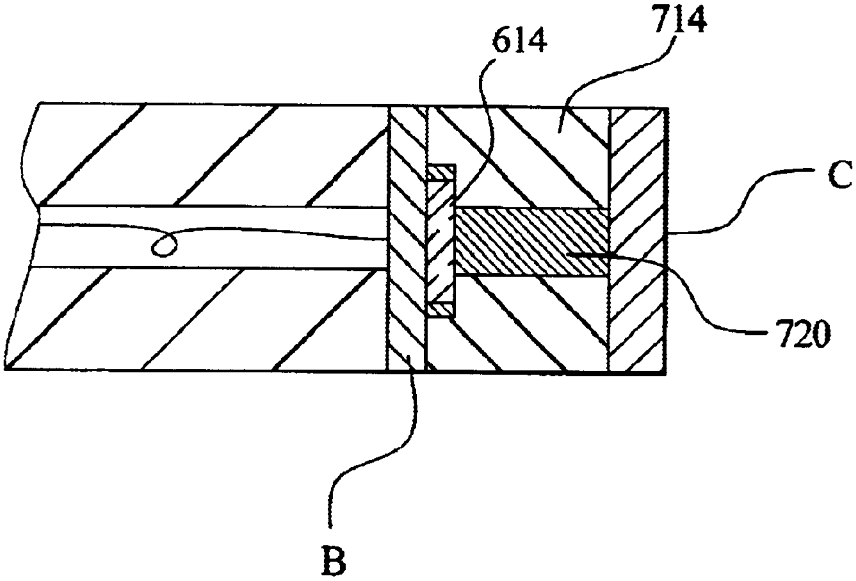
FIG. 9 illustrates a cross-sectional view of another overcurrent and overvoltage protection device according to an alternative embodiment of the present invention.
Figure 10:
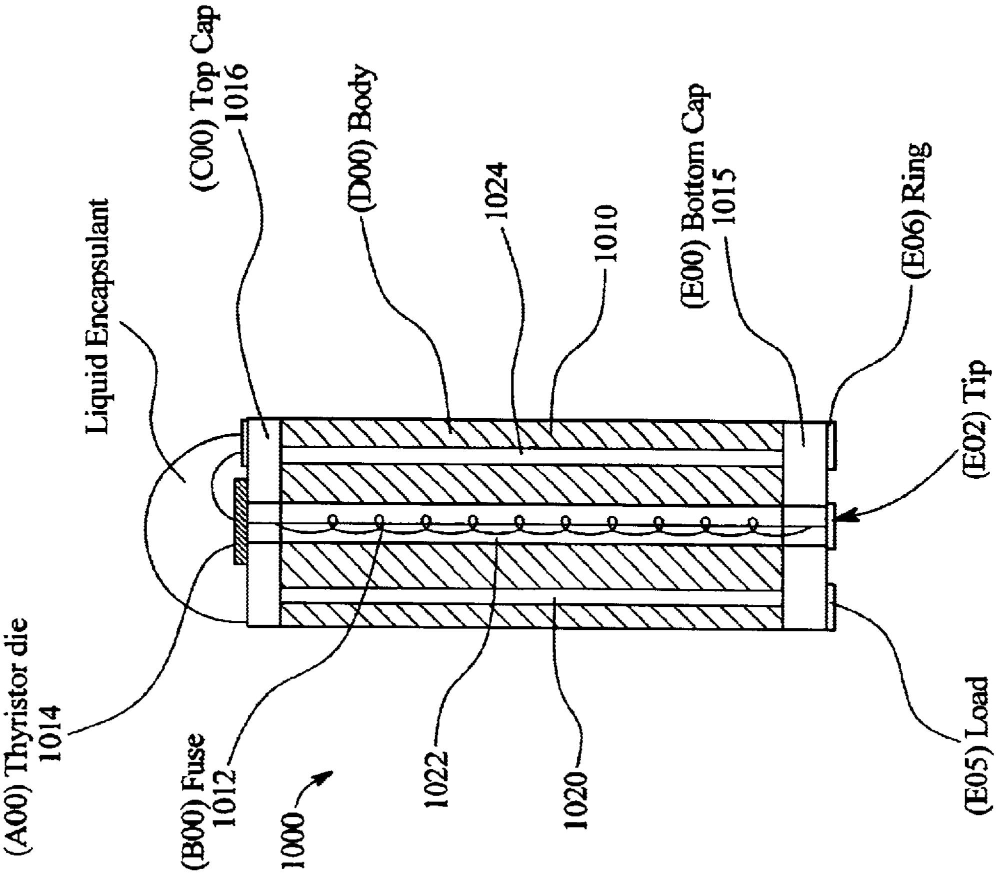
FIG. 10 illustrates a cross-sectional view of another overcurrent and overvoltage protection device according to an alternative embodiment of the present invention.
Figure 10:
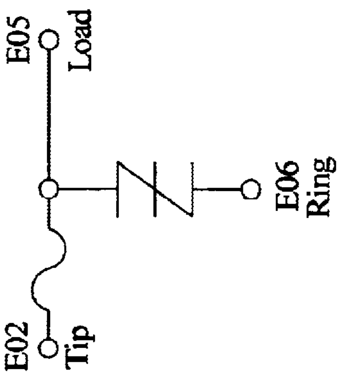

FIG. 9 illustrates an alternative embodiment of the present invention in which the end termination 620 is removed. In this example, the insulating frame 714 provides the second end of the device 700. Again, the insulating frame is selectively metallized. The termination (C) is made through the metallized through hole of the insulating frame.

FIGS. 10–13 illustrate another embodiment of the present invention that provides a discrete device 1000 that is "standing up" as a vertical tower. Similar to the devices discussed above, the vertical tower device 1000 includes an insulating housing 1010, a semiconductor die 1014, a fuse element 1012 and end terminations 1015, 1016. The housing includes first, second and third hollow portions 1020, 1022, 1024. (See also FIG. 12) To this extent, the fuse element 1012 is positioned in one hollow portion 1022. The other two hollow portions 1020, 1024 may be through hole plated or house a small gauge wire.

Figure 11A:
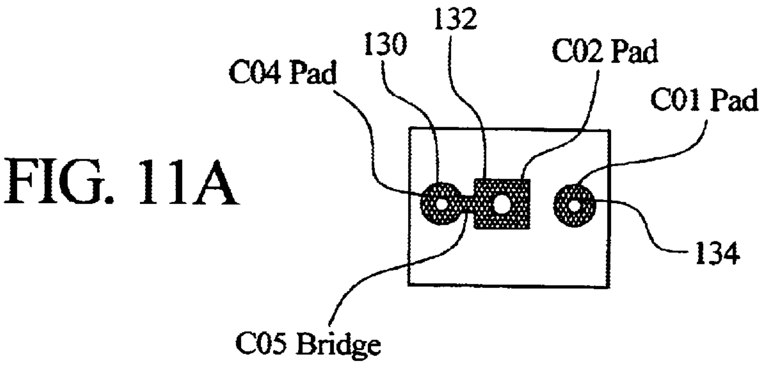
FIGS. 11A, 11B and 11C illustrate a top end termination of the embodiment of FIG. 10.
Figure 11B:
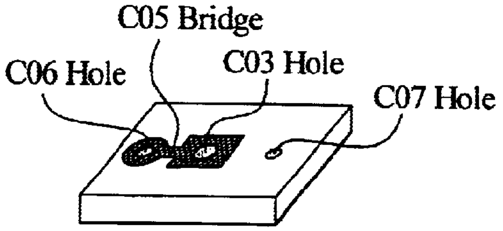
Figure 11C:
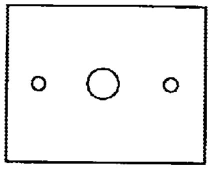
Figure 12:
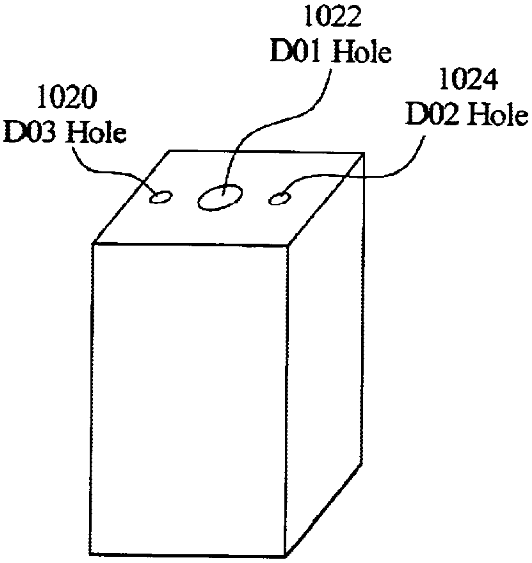
FIG. 12 illustrates a housing of the embodiment of FIG. 10.

The semiconductor die 1014 is disposed on the top cap 1016. As shown in FIGS. 11A–11C, the top cap 1016 has three pads 130, 132, 134. Two of the pads 130, 132 are connected together to form the common point of one fuse terminal and one thyristor terminal (the load point). Two terminals of the die are connected to the top cap pattern pads using solder or conductive epoxy or wire bond.

Figure 13A:
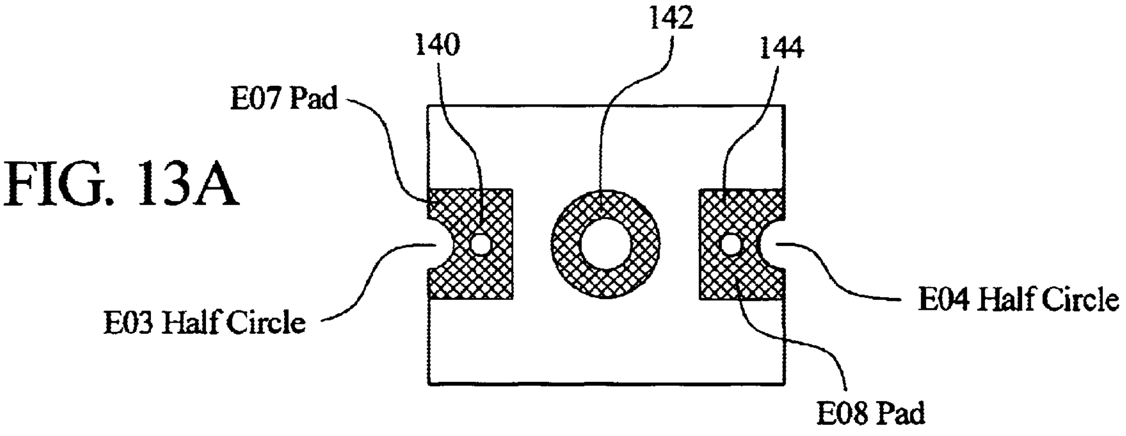
FIGS. 13A, 13B and 13C illustrate the bottom end termination of the embodiment of FIG. 10.
Figure 13B:
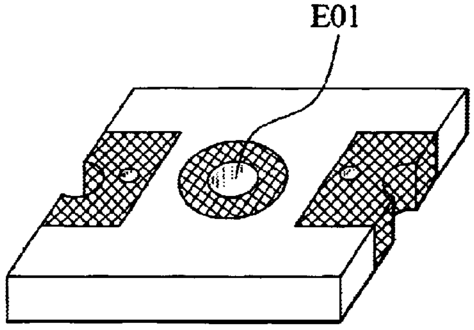
Figure 13C:
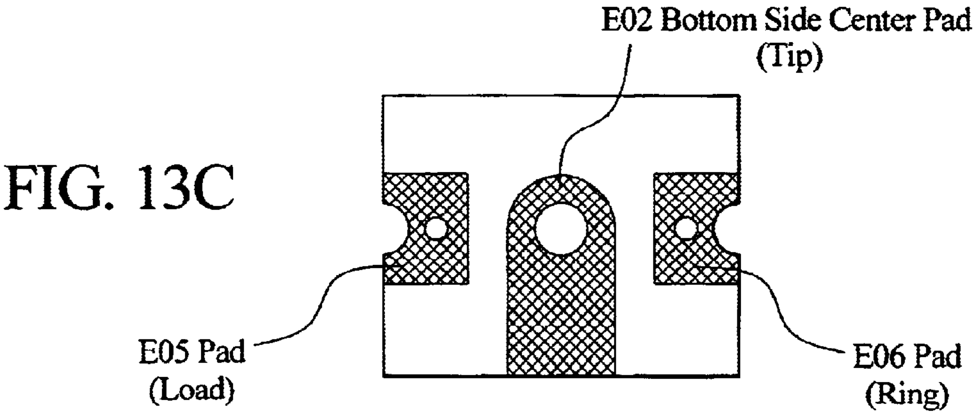

As shown in FIGS. 13A–13C, the bottom cap 1015 has three separate pads 140, 142, 144 that are Load Tip and Ring, respectively. The fuse element is connected to both the top and bottom caps 1016, 1015. In addition, the semiconductor die 1014 is encapsulated 1040 on the top of the vertical tower by an encapsulate that atmospherically seals the device.

The vertical tower device 1000 is advantageous because it can save even more valuable space on a printed circuit board than its horizontal counterparts. In addition, a number of vertical tower devices 1000 can be arranged together to form an array.

It should be understood that various changes and modifications to the presently preferred embodiments described herein will be apparent to those skilled in the art. Such changes and modifications can be made without departing from the spirit and scope of the present invention and without diminishing its attended advantages. It is therefore intended that such changes and modifications be covered by the appended claims.

We claim:

1. An integral circuit protection device providing overcurrent and overvoltage protection for a circuit and configured to be connected to the circuit, the integral circuit device comprising:

an overcurrent protection portion;

an overvoltage protection portion disposed at one end of two opposing ends of the device; and a plurality of terminals for connecting the overcurrent protection portion and the overvoltage protection portion to the circuit, wherein the plurality of terminals are substantially disposed, respectively, at one of the two opposing ends.

2. The integral circuit device of claim 1, wherein the overcurrent protection portion is a fuse.

3. The integral circuit device of claim 1, wherein the overvoltage protection portion is a semiconductor die having characteristics similar to a zener diode.

4. The integral circuit device of claim 1, wherein the overvoltage protection portion is a bi-directional thyristor.

5. The integral circuit device of claim 1, wherein the plurality of terminals includes first, second and third terminals; and the overcurrent protection portion is electrically connected between the first and second terminals and the overvoltage protection portion is connected between the second and third terminals.

6. The integral circuit device of claim 1, wherein the plurality of terminals of the integral circuit device are configured to electrically connect the overcurrent protection portion in series with the circuit to be protected and to electrically connect the overvoltage protection portion in parallel with the circuit to be protected when the integral circuit device is electrically connected to the circuit to be protected.

7. The integral circuit device of claim 1, further comprising:

a thermally conductive portion that conducts heat away from the overvoltage protection portion.

8. The integral circuit device of claim 5 wherein the first terminal is configured at the first end, the second terminal is configured at the second end, and the third terminal is configured at the second end disposed outward from the second terminal.

9. The integral circuit device of claim 8, wherein the overvoltage protection portion is disposed between the second and third terminals.

10. The integral circuit device of claim 5, wherein the first terminal is positioned at the first end, the second terminal is positioned at the first end, and the third terminal is positioned at the second end.

11. The integral circuit device of claim 10, wherein the overvoltage protection portion is disposed inward of and adjacent to the third terminal.

12. The integral circuit device of claim 5, wherein first, second and third terminals are disposed on the same end of the device.

13. The integral circuit device of claim 5, wherein first, second and third terminals are disposed on the end opposing the end of the device that the overvoltage protection portion is on and further comprising an encapsulation that covers the overvoltage protection portion.

14. The integral circuit device of claim 5, wherein the device further comprises a housing having first and second ends wherein the overcurrent protection portion is contained by the housing and the first, second and third terminals are disposed outward of the first and second housing ends.

15. The integral device of claim 5, wherein first, second and third terminals are disposed on the same end of the device and the overcurrent protection portion includes at least one hollow portion of electrically rought and interconnect the terminals.

16. The integral circuit device of claim 1, wherein the overvoltage protection portion further includes an insulating frame having a first end and a second end and a hollow inner portion extending therebetween, an overvoltage protection element being configured within the inner hollow portion.

17. The integral circuit protection device of claim 1, wherein the first, second and third terminals are formed on at least one same side of the integral circuit protection device.

18. The integral circuit protection device of claim 1, wherein the integral circuit protection device is configured for mounting on a printed circuit board.

19. An integral overvoltage and overcurrent protection device, comprising:

an insulating housing having a first end and a second end and a hollow portion extending therebetween;

a fuse element in the hollow portion;

at least two terminations, a first termination on the first end of the housing, a second termination on the second end of the housing;

an overvoltage protection portion on the second end of the housing.

20. The integral device of claim 19, wherein the overvoltage protection portion further includes a conductive plate, the conductive plate being adjacent to the overvoltage protection element.

* * * * *